Oct. 18, 1932.  C. W. BELL  1,883,492
BATTERY CHARGING SYSTEM
Filed April 8, 1929   2 Sheets-Sheet 2
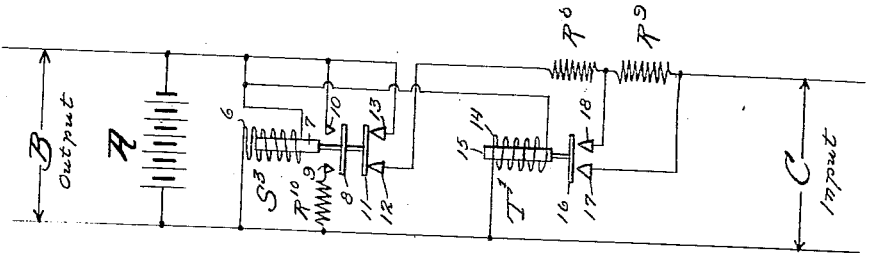
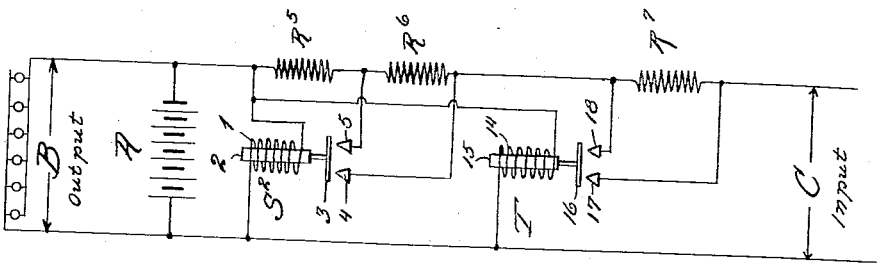
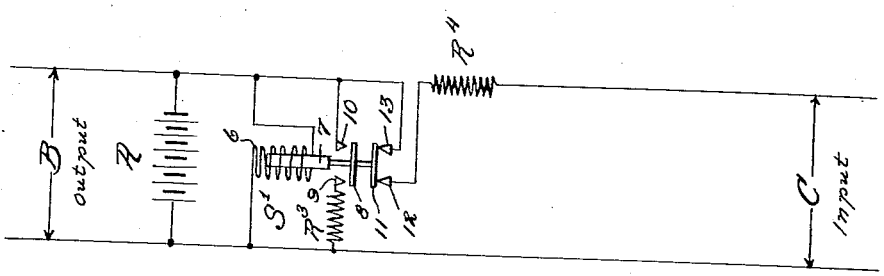
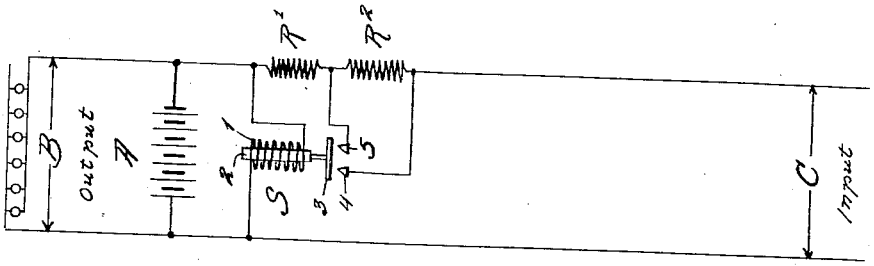
Inventor
Charles W. Bell
By
Attorney Patented Oct. 18, 1932

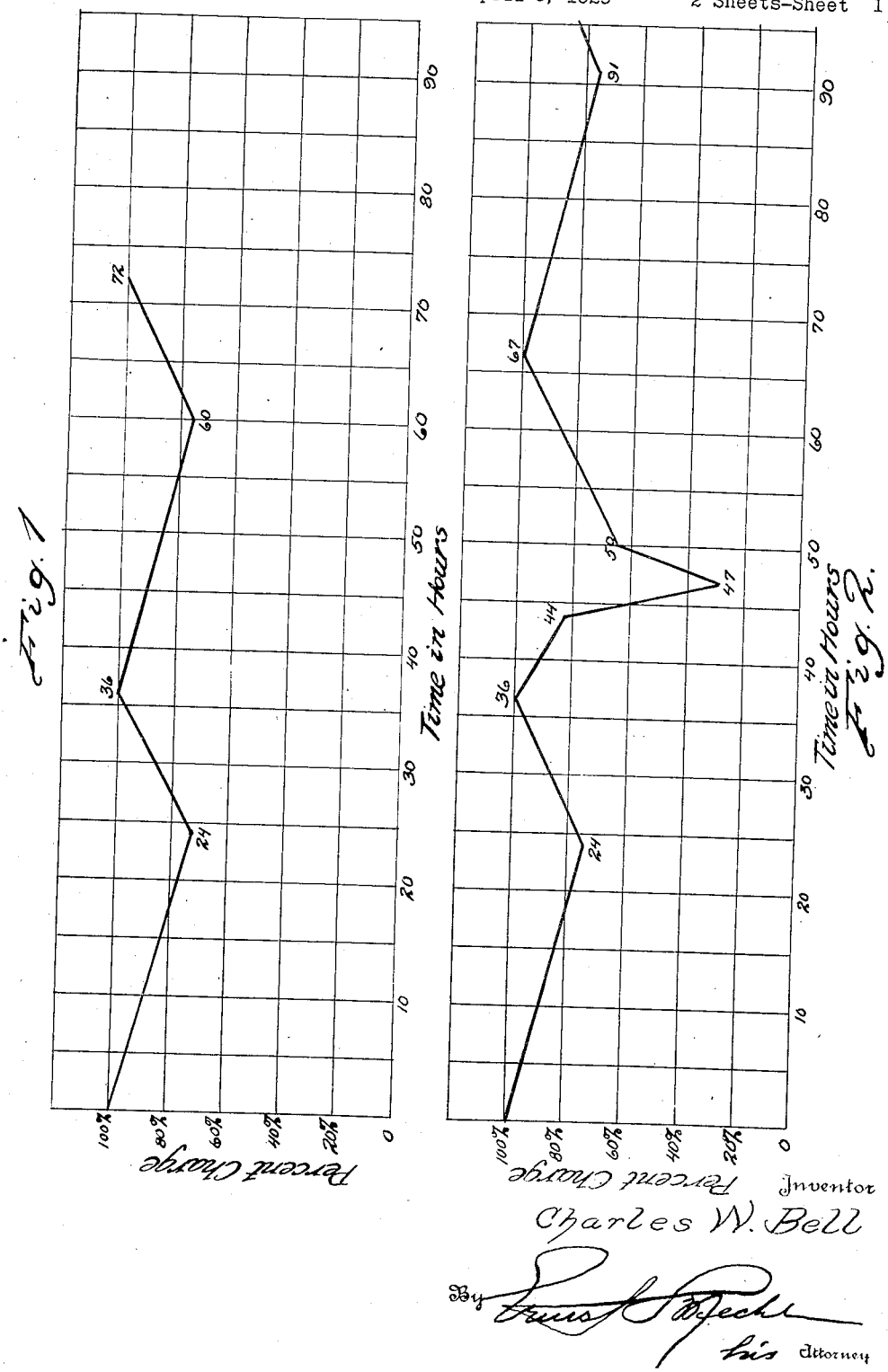

1,883,492

UNITED STATES PATENT OFFICE

CHARLES W. BELL, OF BUFFALO, NEW YORK, ASSIGNOR, BY MESNE ASSIGNMENTS, TO GOULD STORAGE BATTERY CORPORATION, OF DEPEW, NEW YORK, A CORPORATION OF DELAWARE

BATTERY CHARGING SYSTEM

Application filed April 8, 1929. Serial No. 353,585.

The invention relates to charging systems for storage batteries and has for its general object the provision of a circuit arrangement whereby a variable current is supplied to the battery depending upon its condition, the work it is called upon to do and other circumstances.

It is well known that there has been a very strong trend toward the use of storage batteries on either the floating or trickle charge method of operation. Neither method has proved entirely satisfactory for various reasons which are mostly as follows: In a pasted plate battery there is a certain minimum rate of constant input required to a lead-acid cell (which is not required to do very much work or which does not pass through any considerable portion of a complete cycle of discharge and charge) in order to keep the negative plates in a live and active condition with the lead itself spongy. If this minimum input is not obtained or where the work to be done by the cell is insufficient to work the negative plates properly, such plates gradually become less and less active, the active material apparently losing its spongy character and consolidating, thus reducing the activity and capacity. Unfortunately, this minimum current required for a floating battery to keep the negative plates active is a rate too high for the positive plates and causes quite rapid wear thereon. The operator of such a battery is consequently on the horns of a dilemma. If a trickle charge rate sufficiently high to keep the negative plates active is employed, the positive plates are abused and if the input rate is reduced to a point suitable for the positive plates the negatives being to give trouble on account of losing their spongy characteristics.

It is with the above facts in view that I have devised the present invention which comprises a circuit so arranged as to perform a certain definite cycle in operation which overcomes the above objections without reducing the reliability of the installation from the standpoint of its being maintained in a condition of charge sufficient to take care of an emergency. My system contemplates the employment of two schemes or, rather one as a basis with an extension thereof as a modification or alternative.

Broadly considered, the first or basic scheme comprises a circuit arranged in such manner that assuming we start with a battery in a state of full charge, the battery will slowly discharge to a given point, say for example seventy-five (75) to eighty per cent (80%) charge, subsequently to which the system will operate to put into the battery a rate of charge sufficiently high to maintain the negative plates in good condition. A rate proper for this purpose will not cause undue wear or action on the positive plates because it is put into the battery only when the plates are below a state of full charge. As soon as an approximately fully charged condition is restored the mechanism will operate to permit the battery to slowly discharge itself back to the minimum selected charge point, say seventy-five (75) to eighty per cent (80%) charged. In this way it will be apparent that the system is, in a way, a species of combination of the trickle charge with a partial cycle though it should be noted that the discharge cycle is only a comparatively small one and is stopped before the battery is discharged to a point which would affect the reliability or ability to take care of an emergency condition. The recharge cycle is carried out at a charging rate which while sufficiently high to keep the negatives in good condition is not high enough to cause undue wear as would be the case in a battery recharged at the normal rate in a full cycle method of operation. Furthermore, the sequential partial charge, discharge and recharge will operate to maintain the battery in good condition throughout, as should be realized by those experienced in storage battery practice.

The extension or alternative of the above described basic scheme is the application of a third element in the circuit which comes into operation only if the battery becomes discharged as the result of an emergency to a point somewhat below the determining point for the basic scheme. Assuming that the basic scheme operates at the specified point of seventy-five (75) to eighty per cent

(80%) charge, then the third element will come into operation at a point approximately sixty-five (65) to seventy per cent (70%) charge. This third element operates in such manner that if the battery, through an emergency discharge, falls to a point below sixty-five (65) to seventy-five per cent (75%) charged it will operate to increase the input so that this input will be considerably higher than that on the charge cycle of the basic scheme, probably approximately the normal charge rate of the battery or possibly a still higher rate, the increase continuing only until the battery returns to its determining point of sixty-five (65) to seventy per cent (70%) charge whereupon the basic condition will be restored. A fairly high rate of charge when the battery is below sixty-five (65) to seventy per cent (70%) charged will not cause undue wear because at a fairly high rate below this point gassing and heating will not occur. At the same time, the reliability of the installation is assured by the rapid return of the battery to the sixty-five (65) to seventy per cent (70%) charged point in case of emergency discharge.

While it is conceivable that the invention may be carried out in numerous ways, I have illustrated, diagrammatically, how the desired results may be brought about.

In the drawings:

Figure 1 is a diagram indicating the operating cycle in accordance with the basic scheme, Figure 2 is a similar diagram indicating the operation of the modified system, and Figures 3, 4, 5 and 6 are diagrams showing circuit arrangements for carrying out the invention.

Referring more particularly to the drawings, Figure 1 discloses the curve for the operating cycle, the percentage of charge being plotted against time. It will be observed that the battery, starting at a condition of full charge or one hundred per cent (100%), slowly discharges itself to a condition of approximately seventy-five per cent (75%) charged in about a twenty-four hour period. It is then returned to a condition of full charge in a twelve hour period, and this cycle is repeated. The time periods given are not absolute but it is intended that they be worked out for particular sizes and types of batteries and certain applications so that the time period of the recharge portion of the cycle will bear such relation to the full cycle that the rate of recharge will be sufficiently high to maintain the negative plates in good condition and yet low enough to prevent undue wear on the positive plates.

Figure 2 shows the same system amplified to include an emergency discharge and recharge condition, this being indicated by the marked dip in the curve where the percentage of charge is shown as having dropped from eighty-four per cent (84%) to forty-seven per cent (47%) in a very brief time subsequently to which the increased charging rate brings the percentage of charge up to approximately sixty-three per cent (63%), with a more gradual rise thereafter.

Figure 3 discloses an arrangement whereby the diagrammatic action illustrated in Figure 1 may be accomplished. In this figure, the letter A designates a storage battery across which there is a steady load, the conductor B being in the output circuit and the conductor C representing the input circuit. In a case like this there will be two input rates, one for the slow discharge cycle which is sufficiently less than the output from the battery to cause the battery to discharge slowly. This input rate may conveniently be called X. Secondly, there is to be a higher input rate which is sufficiently higher than the steady output load as to cause an appreciable input, enough to keep the negatives in good condition but insufficient to cause undue wear on the positives providing this higher rate is reduced when the battery reaches the state of approximately full charge. This higher rate may conveniently be designated as Y. In this figure, $R^1$ designates a resistance of such size that when it is the only resistance in the circuit the input rate Y will flow into the battery. $R^2$ is an additional resistance which is of such size that when in series with $R^1$ there will be the lower input previously designated as X. S designates a mechanism so arranged that when the battery reaches a state of full charge the resistance $R^2$ is cut into the circuit C, and when the battery drops to a condition of seventy-five (75) to eighty per cent (80%) charged $R^2$ will be cut out of the mechanism. This mechanism S may of course be anything suitable or desirable for the purpose, there being no particular limitation as to the exact form thereof or how it accomplishes the desired action. However, for purposes of illustration only, I have shown this device as comprising a conventional type of relay or electromagnetic circuit controller including a solenoid 1 having a movable core 2 slidable therein and carrying a contact 3 adapted to engage a pair of contacts 4 and 5 connected with one conductor of the charging line at opposite ends of the resistance $R^2$. It is clear that when the battery drops to a condition of 75 to 80% charged, the solenoid 1 will be weakened and will permit the core 2 to drop, the contact 3 then bridging the contacts 4 and 5 and shorting out the resistance $R^2$ so that the charging rate to the battery will be increased.

In Figure 4 I have illustrated substantially the same application in the case of a battery operating on a circuit in which there is not a steady load on the battery. In this instance the controlling mechanism operates to put a small steady discharge load across the battery, as represented by $R^3$, of a size sufficient to discharge the battery slowly and open the input circuit. In this circuit there is provided a mechanism $S^1$ for accomplishing this action, and I also provide a resistance $R^4$ corresponding to the resistance $R^2$. For the sake of illustration, the mechanism $S^1$ is shown as comprising a solenoid 6 having a slidable core 7 and carrying a contact 8 adapted to engage and bridge a pair of contacts 9 and 10, the former of which is connected with one terminal of the resistance $R^3$, the other terminal of which is connected with one conductor of the charging line and one battery terminal, and the latter of which is connected with the other terminal of the battery. The solenoid also carries a contact 11 adapted to engage and bridge a pair of contacts 12 and 13 interposed in the other conductor of the charging line. In this instance under normal circumstances the solenoid 6 is not strong enough to draw the core 7 into itself and the result is that the contact 11 bridges the contacts 12 and 13 for closing the charging circuit. If, however, the battery becomes overcharged or charged to an extent beyond that considered the safest or best, the solenoid 6 which is always connected across the battery will be strengthened and will draw the core 7 upwardly so that the contact 8 will engage and bridge the contacts 9 and 10 while at the same time the contact 11 disengages the contacts 12 and 13. It will therefore be clear that the charging circuit is broken and the resistance $R^3$ put across the battery for providing an artificial load which will operate to reduce the voltage of the battery until the solenoid is sufficiently weakened that the core and contacts may again drop and reclose the charging circuit while cutting out the resistance $R^3$.

Figure 5 represents the same general scheme amplified to take care of the necessary rapid recharging of the battery in the event that an emergency discharge has occurred. In this instance use is made of a mechanism $S^2$ corresponding to that at S in Figure 3, together with resistances $R^5$ and $R^6$ corresponding to the resistances $R^1$ and $R^2$. In addition to this there is provided a mechanism T, similar to that at $S^2$, which operates when the battery falls to a point of sixty-five (65) to seventy per cent (70%) charged to additionally increase the rate by cutting out the resistance $R^7$. In this connection, the resistances $R^5$ and $R^7$ would be equal to the resistance $R^1$ in Figure 3 and would be of sufficient size to increase the input rate to Z which is still greater than the input rate Y above referred to. While the mechanism T may be of any preferred type appropriate for the purpose, it is here disclosed as comprising a solenoid 14 connected across the battery and having a slidable core 15 carrying a contact 16 adapted to engage and bridge a pair of contacts 17 and 18 connected with the opposite terminals of the resistance $R^7$. Clearly, under normal circumstances the solenoid 1 is sufficiently strong to hold the core 2 elevated with the contact 3 out of engagement with the contacts 4 and 5, the solenoid 14 having also sufficient strength to hold the core 15 up with the contact 16 out of engagement with the contacts 17 and 18. The windings of the solenoids 1 and 14 are so proportioned or related that they operate in sequence, the strength of the solenoid 1 being decreased when the battery drops to a condition of say 75 to 80% charged so that the contact 3 will engage and bridge the contacts 4 and 5 for cutting out the resistance $R^6$, while the solenoid 14 still has sufficient strength to hold the core 15 and contact 16 up until the battery drops to a condition of say 65 to 70% charged whereupon it will be sufficiently weakened to permit the core 15 and contact 16 to drop and bridge the contacts 17 and 18 for cutting out the resistance $R^7$ and additionally increasing the charging rate. Of course as the battery becomes increasingly charged the strengthening of the solenoid 14 will operate to break the connection between the contacts 17 and 18 for throwing the resistance $R^7$ into the charging circuit, subsequently to which as the battery approaches the maximum charged condition, the strengthening of the solenoid 1 will operate to draw up the core 2 and contact 3 for breaking the connection between the contacts 4 and 5 so that the resistance $R^6$ will be cut into the circuit for additionally reducing the charging rate.

In Figure 6, I have illustrated a condition in which the battery does not have a steady load across it. In this circuit there are provided resistances $R^8$, $R^9$ and $R^{10}$, the first two corresponding to the resistance $R^7$ in Figure 5 and the last mentioned corresponding to $R^3$ in Figure 4. There is also provided a mechanism $S^3$ corresponding to $S^1$ in Figure 4, together with a mechanism $T^1$ corresponding to the mechanism T in Figure 5. In this instance the total of $R^8$ and $R^9$ is equal to $R^1$ in Figure 3 and $R^{10}$ is of such size that when cut out of the circuit the input rate will be of the value Y above referred to. Figure 6 therefore shows a structure combining the actions and advantages of what is shown in Figures 3 and 4 as means is provided for providing an artificial load and breaking the input circuit when the battery reaches a maximum charged condition, for increasing the charging rate when the battery drops below the desired minimum charged condition.

From the foregoing description and a study of the drawings taken in conjunction with the preliminary remarks at the forepart of the specification it is believed that the arrangement, operation and advantages will be readily apparent to one skilled in the art without further explanation.

While I have shown and described certain specific arrangements and have mentioned certain types of instruments capable of performing the functions, it should be understood that this disclosure is merely an exemplification of the principles involved as the right is reserved to resort to the employment of other apparatus and other circuit modifications provided such variations constitute no departure from the spirit of the invention or the scope of the claims hereunto appended.

Having thus described the invention, I claim:

1. The method of operating a storage battery subjected to a variable load comprising applying a predetermined input rate thereto during normal load conditions, automatically increasing the said rate in the event of a sudden discharge while maintaining constant connection with the load and supplying an artificial load and discontinuing the input automatically when the percent-charged-condition exceeds a maximum.

2. In a storage battery charging system, resistances in the input circuit, a circuit closer connected across the battery and operable to cut in additional resistance for reducing the charging rate when the battery approaches a fully charged condition, and a circuit closer connected across the battery for increasing the charging rate when the battery approaches the minimum desirable charged condition, the input being constantly connected to the battery.

3. In a storage battery system, a storage battery having input and output circuits connected thereto, an artificial load in the output circuit for discharging the battery at a low rate when the battery voltage exceeds a predetermined limit, and means in the input circuit responsive to the voltage of the battery for recharging the battery when the same has been discharged within a predetermined per cent charged condition.

4. In a storage battery system, a storage battery, input and output circuits therefor, an artificial load adapted to be connected automatically in the output circuit for reducing the per cent-charged condition of the battery to a predetermined point, resistance means in the input circuit, and means responsive to per cent-charged-condition of the battery for cutting successive portions of said resistance sequentially into or out of the input circuit.

5. In a storage battery system including a storage battery, a charging circuit therefor connected therewith and a variable load connected thereto, electro-magnetically operated means responsive to a decrease in the strength of the battery below a predetermined minimum per-cent-charged-condition for increasing the current in the charging circuit, an artificial load, and means responsive to an increase in the per-cent-charged-condition of the battery for connecting the artificial load across the battery and disconnecting the charging circuit.

In testimony whereof I affix my signature.

CHARLES W. BELL.